US007284045B1

(12) United States Patent
Marl et al.

(10) Patent No.: US 7,284,045 B1
(45) Date of Patent: Oct. 16, 2007

(54) METHOD AND SYSTEM FOR DETERMINING INFORMATION TO ACCESS AN ELECTRONIC MAIL ACCOUNT

(75) Inventors: Coyle Brett Marl, Seattle, WA (US); Gregory Scott Friedman, Sammamish, WA (US)

(73) Assignee: Visto Corporation, Redwood city, CA (US)

( * ) Notice: Subject to any disclaimer, the term of this patent is extended or adjusted under 35 U.S.C. 154(b) by 885 days.

(21) Appl. No.: 09/872,859

(22) Filed: Jun. 1, 2001

(51) Int. Cl.
*G06F 15/173* (2006.01)
*G06F 15/16* (2006.01)
*G06F 15/177* (2006.01)

(52) U.S. Cl. ............... 709/223; 709/203; 709/206; 709/219; 709/226; 709/227

(58) Field of Classification Search ............ 709/229, 709/230, 206, 228, 232, 245, 202, 203, 217, 709/223, 226, 227; 713/202; 370/401, 486; 455/412
See application file for complete search history.

(56) References Cited

U.S. PATENT DOCUMENTS

| | | | | |
|---|---|---|---|---|
| 5,684,951 A | * | 11/1997 | Goldman et al. | 713/202 |
| 5,752,059 A | * | 5/1998 | Holleran et al. | 709/245 |
| 6,108,691 A | * | 8/2000 | Lee et al. | 709/206 |
| 6,334,140 B1 | * | 12/2001 | Kawamata | 709/202 |
| 6,438,583 B1 | * | 8/2002 | McDowell et al. | 709/206 |
| 6,631,416 B2 | * | 10/2003 | Bendinelli et al. | 709/227 |
| 6,697,942 B1 | * | 2/2004 | L'Heureux et al. | 713/152 |

OTHER PUBLICATIONS

Hong, Method and System For Interrogating The Internet, Apr. 20, 2000, WIPO, WO 00/22543.*

* cited by examiner

*Primary Examiner*—Ario Etienne
*Assistant Examiner*—Hussein El-chanti
(74) *Attorney, Agent, or Firm*—Oblon, Spivak, McClelland, Maier & Neustadt, P.C.

(57) ABSTRACT

An automatic detection device and method for determining the access data necessary to access an existing electronic mail account. Further, the automatic detection device and method can determine whether an electronic mail account can be accessed according to a specific electronic mail protocol. With the detection device and method, the user provides the password and address for an existing electronic mail account. From this information, the automatic detection device and method determines the user name and the server name for the server hosting the electronic mail account. The device and method then employs the user name, server name and password to determine whether the electronic mail account can be accessed according to a particular electronic mail protocol, such as the post office protocol, and, if possible, to access the electronic mail account.

15 Claims, 5 Drawing Sheets

METHOD AND SYSTEM FOR DETERMINING INFORMATION TO ACCESS AN ELECTRONIC MAIL ACCOUNT

FIELD OF THE INVENTION

The invention relates to a method and system for determining information needed to access an electronic mail account, such as the user name for the account, the password for account, and the computer or server on which the electronic mail account is hosted. Further, the invention relates to a method and system for determining the information needed to access an electronic mail account according to an electronic mail protocol, such as the post office protocol.

BACKGROUND OF THE INVENTION

Electronic mail is becoming a common form of communication in our modern society. It advantageously permits a user to retrieve text or even voice messages from almost anywhere in the world. Accordingly, some electronic mail systems employ protocols that will allow an electronic mail account to be accessed from a variety of different electronic mail capable devices. The post office protocol (referred to by the acronym POP), and more particularly its third version (i.e., POP3), is one such commonly used protocol.

To make electronic mail even more convenient, a variety of portable communication devices are currently being developed that will allow an electronic mail account user to access that account from any location in range of a wireless communication transceiver. These portable communication devices include wireless telephones, personal digital assistants, pocket computers and specialized electronic mail access devices. In order to access existing electronic mail accounts, however, the user must typically link a new electronic mail account associated with the portable device to the existing electronic mail account. In addition, some organizations, such as Internet service providers (ISPs), offer aggregated electronic mail services that allow a subscriber access to multiple electronic mail accounts maintained by different parties and at different locations through a single gateway.

One problem that has arisen with the use of such portable communication devices and aggregated electronic mail services, however, occurs with the process of initially configuring them to access an existing electronic mail account maintained by another party. Typically, the device user will be a layman who is unaware of the information that is needed by the communications device or aggregate electronic mail service provider to access an existing electronic mail account maintained by another party. For example, the user will typically not know the name of the server computer that hosts his or her existing electronic mail account. Also, the user may not even know the actual user name associated with his or her account.

This lack of knowledge makes it difficult for a communications device or aggregate electronic mail service provider to configure a new electronic mail account for access to an existing electronic mail account maintained by a third party without assistance. Instead, the user is generally required to obtain assistance from an expert familiar with the existing electronic mail account, which may be time consuming, expensive, and inconvenient. Accordingly, there is a need for a method and system that will allow a communications device or aggregate electronic mail service provider to determine the information necessary to access an existing electronic mail account from the information that will generally be known by a typical electronic mail account user.

BRIEF SUMMARY OF THE INVENTION

The present invention conveniently provides a device and technique that will allow a communications device or aggregate electronic mail service provider to determine the access data needed to create a new electronic mail account that can access an existing electronic mail account, from information that is typically known to the device's user. For example, the access data may include the name of the server computer that hosts the existing electronic mail account. Further, the present invention conveniently provides a device and technique that will allow a communication device to also determine if an existing electronic mail account can be accessed according to a particular electronic mail protocol, such as the post office protocol.

With an automatic electronic mail account detection device according to the invention (hereafter referred to as an automatic detection device), the user provides the automatic detection device with the password and address for an existing electronic mail account. This information is typically well known to the electronic mail account user. From this information, the automatic detection device determines the user name and the server name for the server hosting the electronic mail account. The device then employs the user name, server name and password to determine whether the electronic mail account can be accessed according to a particular electronic mail protocol, such as the post office protocol, and, if possible, to access the electronic mail account.

With particular embodiments of the invention, the automatic detection device separates the address for the electronic mail account into the user name and domain for the account. According to some embodiments of the invention, the automatic detection device may then compare the domain obtained from the address with a list of domains that are "closed" to access by the automatic detection device. For example, if the automatic detection device is configured to send and retrieve electronic mail using only one designated electronic mail protocol (e.g., POP3), then a domain that does not recognize this protocol will be closed to the automatic detection device. If the domain obtained from the address is included on the list of closed domains, then the automatic detection device may inform the user that the electronic mail account cannot be accessed using the designated electronic mail protocol.

According to still other embodiments of the invention, the automatic detection device may compare the domain obtained from the address with a list of domains known to correspond with one or more computer servers. If the domain is on the list of these "known" domains, then the automatic detection device may attempt to access the existing electronic mail account through each of the computer servers associated with that domain. If the automatic detection device is able to access the electronic mail account through one of the associated computer servers using the user name and the password, then the automatic detection device may save the server name for that computer server in the user's profile for future access to that electronic mail account with the communications device. If, however, the automatic detection device is not able to connect and logon to the electronic mail account, then the automatic detection device may prompt the user to re-submit his or her user name and password information. The automatic detection device may then reattempt to access the electronic mail account with the new user name and password information.

With still other embodiments of the invention, the automatic detection device may concatenate one or more preconfigured server-name prefixes with the domain to create a default server name that conforms to conventional server naming conventions. The automatic detection device may then use the generated default server name or names, along with the user name obtained from the address and the password, to attempt to access the user's existing electronic mail account. If the automatic detection device can successfully access the electronic mail account, then the automatic detection device may save that default server name in the user's profile, for future access to that electronic mail account with the communications device.

These and other features of the invention will be discussed in detail below, with reference to the accompanying drawings.

DETAILED DESCRIPTION OF THE INVENTION

Figure 1:
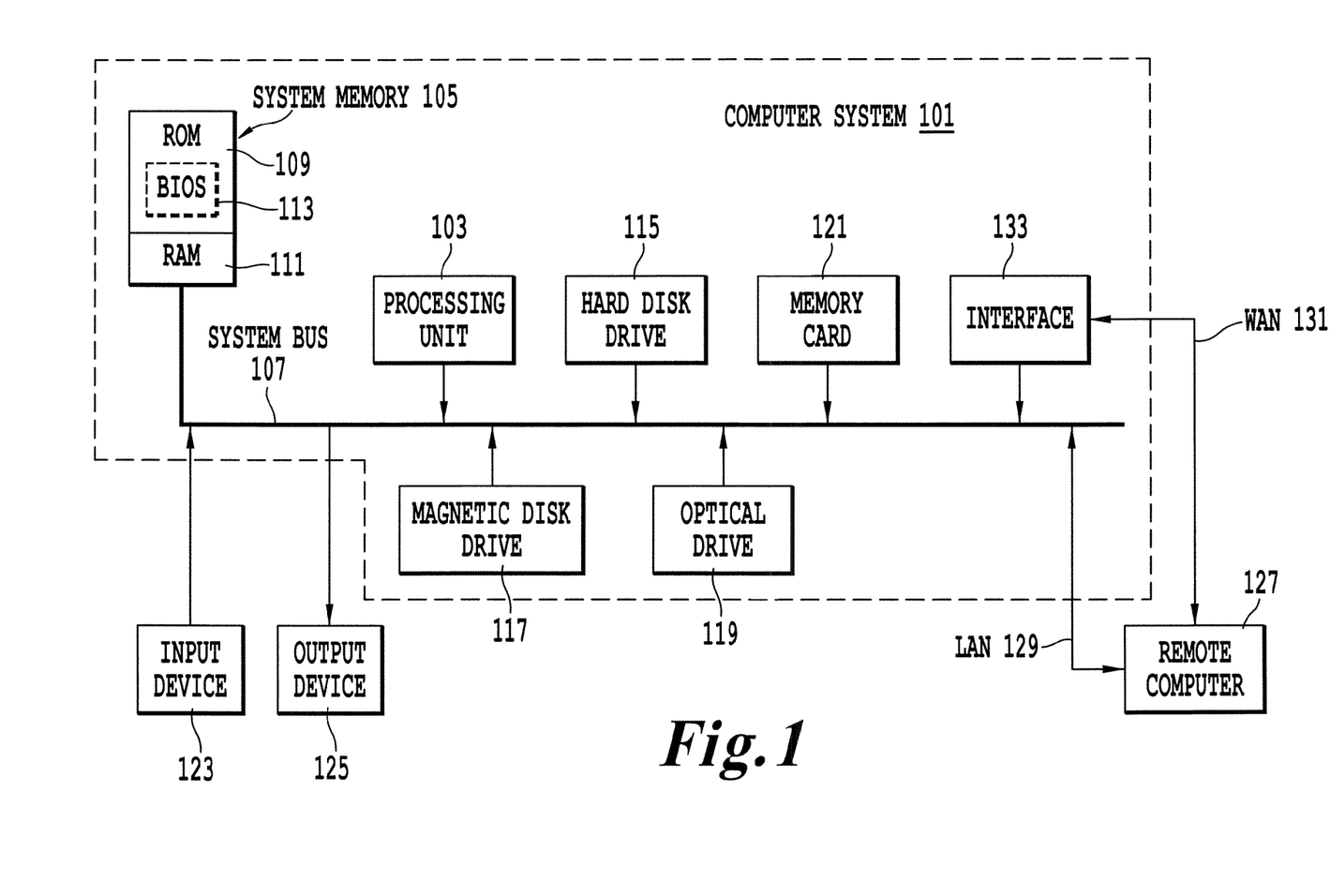
FIG. 1 illustrates one possible computing device for implementing various embodiments of the invention.

As is well known in the art, electronic mail accounts are conventionally accessed with programmable computers programmed to act as electronic mail account communications devices. This type of computer can be embodied by personal computers, personal digital assistants, wireless telephones, and specialized electronic mail delivery and receipt devices. FIG. 1 shows an exemplary programmable computer system 101 for sending and retrieving electronic mail to an electronic mail account. The computer system includes a processing unit 103, a system memory 105, and a system bus 107 that couples various system components including the system memory 105 to the processing unit 103. The system memory may include a read-only memory (ROM) 109 and a random access memory (RAM) 111. A basic input/output system 113 (BIOS), containing the basic routines that help to transfer information between elements within the computer system 101, such as during startup, may be stored in the read-only memory (ROM) 109.

If the computer system 101 is embodied by a personal computer, it may further include a hard disk drive 115 for reading from and writing to a hard disk (not shown), a magnetic disk drive 117 for reading from or writing to a removable magnetic disk (not shown), or an optical disk drive 119 for reading from or writing to a removable optical disk (not shown) such as a CD-ROM or other optical media. If the computer system 101 is embodied by a portable computing device, such as a personal digital assistant or wireless telephone, it may include a removable memory card 121, such as a PCMCIA memory card or a smartcard.

A number of program modules may be stored on the ROM 109, the hard disk drive 115, the magnetic disk drive 117, the optical disk drive 119, or the removable memory card 121. A user may enter commands and information into the computer system 101 through an input device 123, such as a keyboard, a pointing device, a touchscreen, microphone, joystick or any other suitable interface device. Of course, the computer system 101 may employ a variety of different input devices 123, as is known in the art. An output device 125, such as a monitor or other type of display device, is also included to convey information from the computer system 101 to the user. Of course, a variety of output devices 125, such as speakers and printers, may alternately or additionally be included in the computer system 101.

In order to access electronic mail accounts, the computer system 101 preferably is capable of operating in a networked environment using logical connections to one or more remote computers, such as a remote computer 127. The computer system 101 may be connectable to the remote computer 127 through a local area network (LAN) 129 or a wide area network (WAN) 131, such as the Internet. When used in a networking environment, the computer system 101 may be connected to the network through an interface 133, such as a wireless transceiver, a modem, an Ethernet connection, or any other suitable interface device. While the interface 133 is illustrated as an internal interface in FIG. 1, it may alternately be an external interface as is well known in the art. Of course, it will be appreciated that the network connections shown in this figure are exemplary, and other means of establishing a communications link with other computers to access an electronic mail account may be used.

Figure 2:
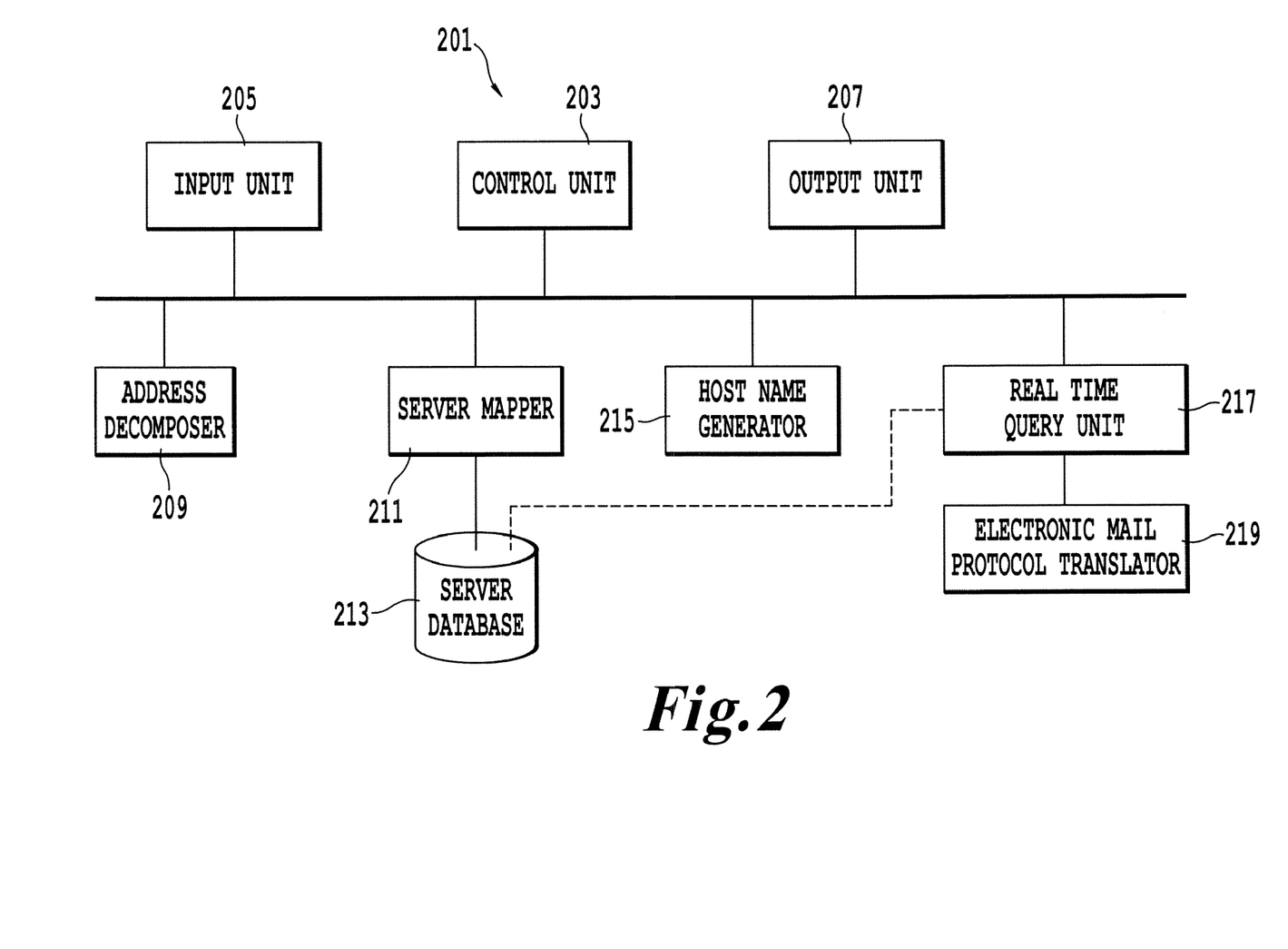
FIG. 2 shows a schematic embodiment of a communications device according to an embodiment of the invention.

An automatic detection device 201 according to one embodiment of the invention, which may be implemented on the computer system 101, is illustrated in FIG. 2. As will be explained in detail below, the automatic detection device 201 determines the access data necessary to access an existing electronic mail account. Further, the automatic detection device 201 determines whether an electronic mail account can be accessed according to a specific electronic mail protocol. In the particular embodiment described below, for example, the automatic detection device 201 determines whether an electronic mail account can be accessed according to the well-known POP3 protocol. Currently, this protocol is supported by nearly all of the electronic mail accounts provided by Internet Service Providers (ISPs) and academic institutions, as well as by Web-based messaging service providers such as Yahoo!, Netscape.com, and Mail.com. Of course, the automatic detection device 201 can additionally or alternately be configured to determine whether an electronic mail account can be accessed according to other electronic mail protocols, such as those used by Web-based mail aggregation services and other electronic mail messaging services, like those provided by Microsoft.com's Hotmail.com, Microsoft Exchange, Lotus Notes, Internet message access protocol (often referred to by the acronym IMAP), etc.

The automatic detection device 201 includes a control unit 203 for controlling the exchange of information between the various components of the device 201. The automatic detection device 201 also includes an input unit 205 for receiving information from a user using the computer system 101, and an output unit 207 for conveying information to the user. The automatic detection device 201 further includes an address decomposer 209 for decomposing a user's electronic mail address into a user name and domain, as will be discussed in detail below. The automatic detection device 201 also has a server mapper 211 and a server database 213. As will be discussed below as well, the server mapper 211 determines which servers are associated with a particular domain in the server database 213, and whether those servers are closed to access by the automatic detection device 201.

Still further, the automatic detection device 201 includes a host name generator 215 and a real time query unit 217.

The host name generator 215 creates possible server names for a computer server hosting a user's electronic mail account. The real time query unit 217 then employs access data provided by one or more of the input unit 205, the address decomposer 209, the known server mapper 211, and the host name generator 215 to generate a query to a user's electronic mail account.

FIG. 2 also illustrates an electronic mail protocol translator 219. The electronic mail protocol translator 219 translates the access information provided by the real time query unit 217 into the format required to access a user's electronic mail account according to a specific electronic mail account protocol, such as POP3 or IMAP. The translator 219 then routes the query to the electronic mail server specified by the access information. As shown in FIG. 2, the electronic mail protocol translator 219 may be included in the automatic detection device 201. Other embodiments of the automatic detection device 201, however, may employ an external electronic mail protocol translator 219 provided by a separate electronic mail messaging application (e.g., Microsoft Outlook or Outlook Express) to transmit the query to the specified electronic mail server.

As will be appreciated by those of ordinary skill in the art, the automatic detection device 201 can be embodied using software implemented on a computer system, such as the computer system 101. For example, the input unit 205, the output unit 207, the address decomposer 209, the server mapper 211, the server database 213, the host name generator 215, the real time query unit 217, and the electronic mail protocol translator 219 may be embodied by one or more software routines. The control unit 203 may then be a master software program that calls the various software routines embodying the different units 205-219. Of course, those of ordinary skill in the art will also appreciate that one or more of the units 203-219 can be embodied by a specialized electronic circuitry.

Figure 3A:
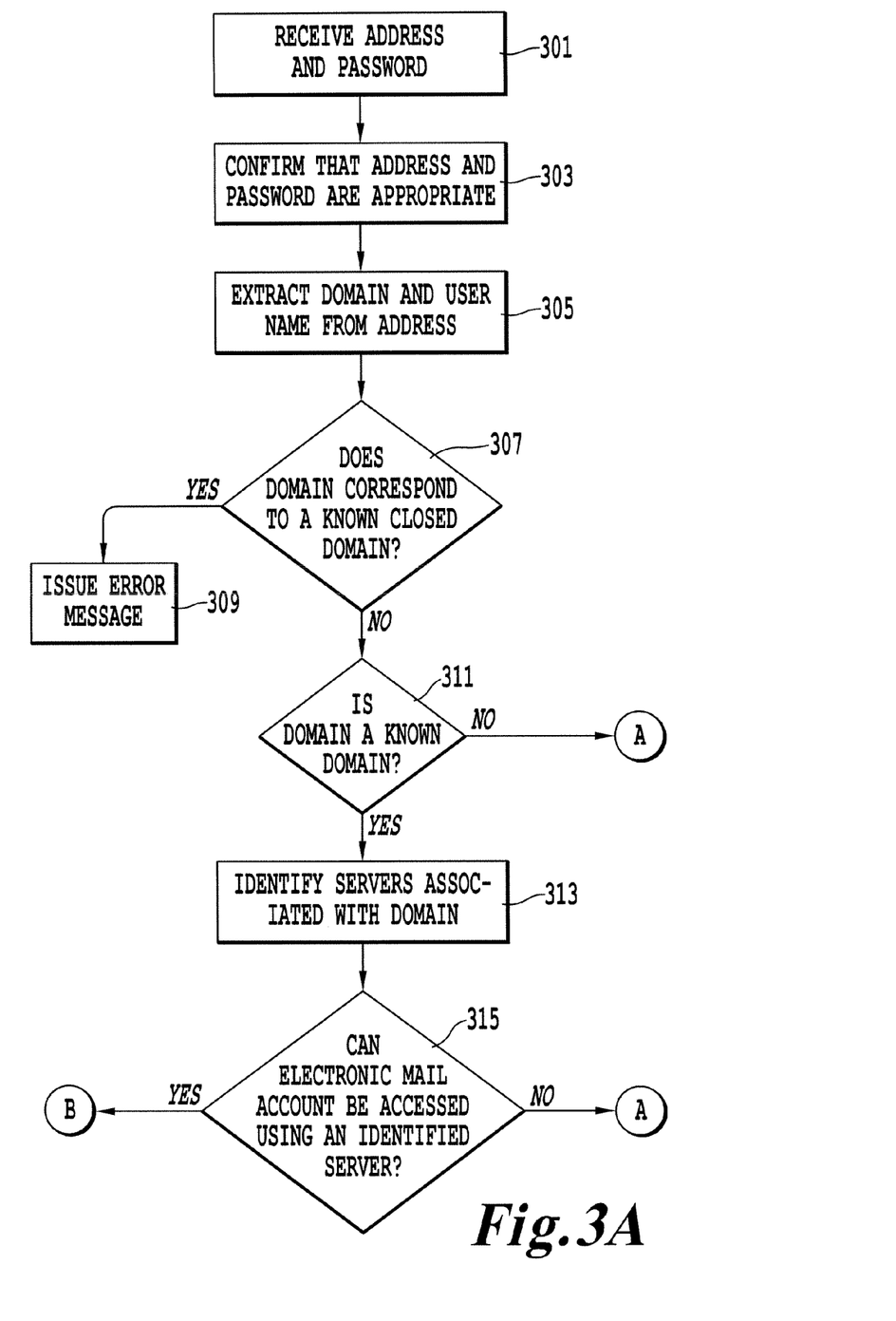
FIGS. 3A, 3B and 4 illustrate methods employed according to one embodiment of the invention.
Figure 3B:
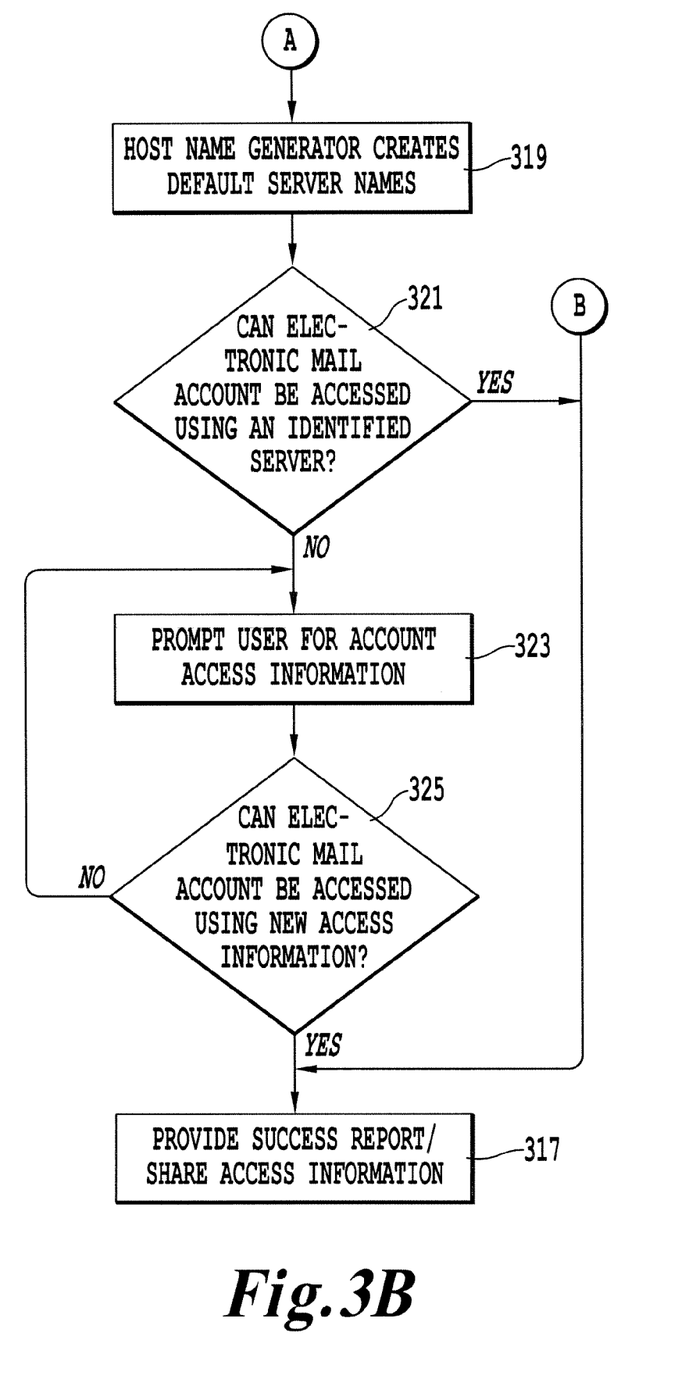

The method of operating the automatic detection device 201 will now be explained with reference to FIGS. 3A and 3B. As shown in FIG. 3A, in step 301, the automatic detection device 201 receives the address for a user's electronic mail account and the password that the user employs to access the account. For example, the output unit 207 may prompt the user to personally provide his or her password and electronic mail address to the input unit 205 through a user interface, such as a graphical user interface. Alternately, however, the input unit 205 may receive this information from another computer system or a software application as part of a provisioning process or similar machine-to-machine process.

Next, in step 303, the automatic detection unit 201 ensures that the information provided to the input unit 205 in step 301 is appropriate. For example, the automatic detection unit 201 may first determine that this information is not "empty," i.e., that the information contains real values for both the password and the electronic mail address. This determination may be made by any component of the automatic detection device 201, such as the input unit 205 or the control unit 203, but is preferably made by the address decomposer 209 for some embodiments of the invention.

In addition, the automatic detection unit 201 may confirm that the electronic mail address provided through the input unit 205 is in the conventional address format of a user name connected to a domain name by the "1" character, and appended by an appropriate domain name suffix such as ".com" (i.e., that the address complies with RFC-882). Again, this determination may be made by any component of the automatic detection device 201, including the input unit 205 and the control unit 203, but is preferably made by the address decomposer 209 for some embodiments of the invention. The operations necessary to perform both of these determinations will be readily apparent to those of ordinary skill in the art.

Next, in step 305, the address decomposer 209 extracts the domain and the user name from the electronic mail address received in step 301. More particularly, the address decomposer 209 divides the electronic mail address into three parts: the character "@", a first text portion occurring before the character "@", and a second text portion occurring after the character "@". The address decomposer 209 then identifies the first text portion as the user name for the electronic mail account (i.e., the name by which the account is identified). The address decomposer 209 also identifies the second text portion as the domain of the server computer hosting the electronic mail account. Thus, after the address decomposer 209 divides the address of the electronic mail account into a user name and domain, the automatic detection device 201 should have the correct user name, domain and password for the user's electronic mail account.

As will be appreciated by those of ordinary skill in the art, some domains will include electronic mail accounts that may not be accessed with the particular electronic mail protocol or protocols employed by the automatic detection device 201, or may otherwise be unavailable for access through the automatic detection device 201 for any reason. For example, if the automatic detection device 201 supports only the post office protocol to send and retrieve electronic mail messages, there are very large domains for maintaining electronic mail accounts, with multiple tens of millions of users, which are "closed" to access via the post office protocol. These messaging domains "closed" to POP3 access currently include, for example, "aol.com," "hotmail.com," and "msn.com." Thus, the automatic detection device 201 may initially determine whether the user's electronic mail account can even be accessed using the specific electronic mail protocols supported by the automatic detection device 201.

For some embodiments of the invention, the automatic detection device 201 makes this initial determination by referring to a list of electronic mail account servers known to be "closed" to access via the electronic mail protocols supported by the automatic detection device 201. For example, if the embodiment of the invention shown in FIG. 2 supports only the POP3 protocol, the server database 213 maintains a list of closed domains that do not provide access to electronic mail accounts via the POP3 protocol. Accordingly, in step 307, the server mapper 211 checks the server database 213 to determine if the domain extracted from the user's electronic mail address in step 305 corresponds to a known "closed" messaging domain (i.e., a domain that is closed to the electronic mail protocols supported by the automatic detection device 201.

If the domain extracted from the user's electronic mail address in step 305 matches a domain on the list of closed domains in the server database 213, then the automatic detection device 201 determines that the electronic mail account cannot be accessed using the electronic mail protocols supported by the device 201. In step 309, the output unit 207 then provides the user with an error message indicating that the user's electronic mail account is closed to access with the supported electronic mail protocol (or protocols), and the automatic detection device 201 halts operation. If the automatic detection device 201 is being used in conjunction with another computer system or application, then the output unit 207 may additionally provide an error code to the other computer system or application indicating that the user's electronic mail account is closed to access with the protocol (or protocols) supported by the automatic detection device 201.

Of course, while the particular embodiment of the invention described above may support only the POP3 protocol, those of ordinary skill in the art will appreciate that other embodiments of the invention may employ other protocols, such as IMAP. Further, various embodiments of the invention may employ multiple protocols, including, e.g., both POP3 and IMAP, to access an existing electronic mail account.

Just as there are domains that are closed to access using the post office protocol, there are also domains known to specifically include one or more computer servers that host electronic mail accounts accessible via the POP3 protocol. If the embodiment of the invention shown in FIG. 2 supports only the POP3 protocol, this list of "known" domains also is included in the server database 213. Thus, if the domain extracted from the user's electronic mail address is not included on the list of closed domains, then, in step 311, the server mapper 211 checks the sever database 213 to ascertain if the domain is a "known" domain, i.e., a domain known to include one or more computer servers hosting electronic mail accounts accessible with the POP3 protocol.

More generically, if the domain extracted from the address of the user's electronic mail account is not a closed domain, then, in step 311 the server mapper 211 compares the domain extracted from the user's electronic mail address in step 305 with a list of "known" domains stored in the server database 213 that are known to employ at least one electronic mail protocol supported by the automatic detection device 201. If the domain extracted from the user's electronic mail address matches a known domain, then the server mapper 211 identifies the names of the computer servers associated with the known domain, conventionally referred to as that domain's server map, in step 313. (A list of names for computer servers associated with a particular domain is referred to as that domain's server map.) If the automatic detection 201 supports more than one electronic mail protocol (e.g., it supports both POP3 and IMAP), then the supported electronic mail protocol employed by each domain may also be stored in the server database 213 and retrieved by the server mapper 211 with the domain's server map.

Next, in step 315, the real time query unit 217 attempts to access the user's electronic mail account at one or more of the computer servers listed in the server map. This process is shown in detail in FIG. 4. More particularly, in step 401, the real time query unit 217 provides the electronic mail protocol translator 219 with one of the server names from the server map, the password obtained in step 301, and the user name extracted from the user's electronic mail address in step 305. If the server database associates the server name with one or more particular electronic mail protocols supported by the automatic detection device 201, then the real time query unit 217 provides this electronic mail protocol (or protocols) to the electronic mail protocol translator 219 as well.

Figure 4:
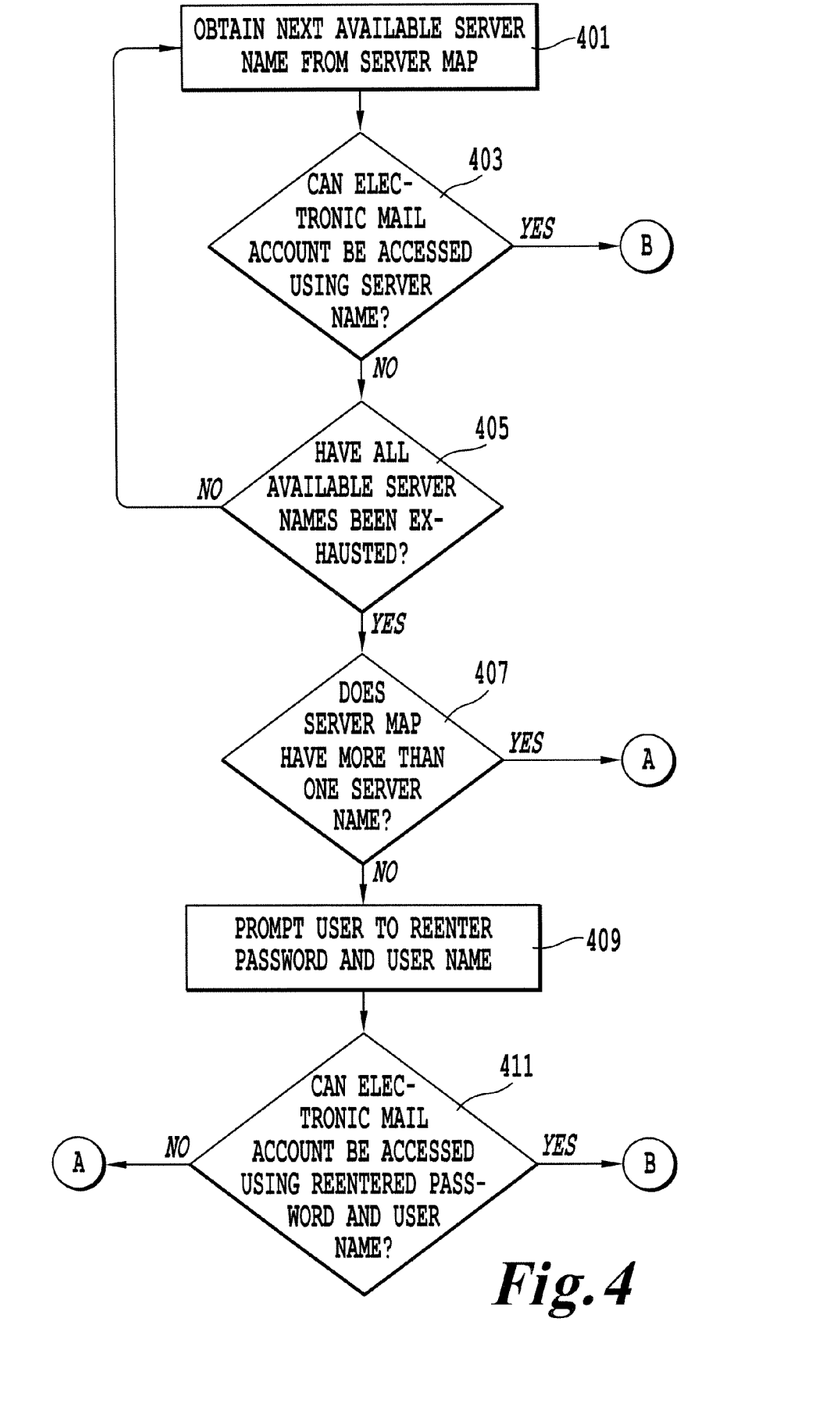

In step 403, the electronic mail protocol translator 219 tries to access the user's electronic mail account using this access data provided by the real time query unit 217. If the electronic mail protocol translator 219 can access the electronic mail account using the server name from the server map, then the operation of the automatic detection device proceeds to step 317 of FIG. 3. If, however, the electronic mail protocol translator 219 is unable to access the electronic mail account using the server name, then the real time query unit 217 determines in step 405 whether there is another available server name from the server map that has not been used in an attempt to access the user's electronic mail account. If so, then steps 401 and 403 are repeated using the next available server name. If, on the other hand, the real time query unit 217 has attempted to access the user's electronic mail account with all of the available server names from the identified server map, the process proceeds to step 407.

It should be noted that a server map for a known domain may contain only one server name, or it may contain a number of server names (e.g., in excess of 2000 server names). If the server map corresponding to the domain extracted from the user's electronic mail account address contains only a single server name, then it is extremely likely that the user's electronic mail account is hosted on that server. Accordingly, if the electronic mail protocol translator 219 cannot access the user's electronic mail account using the server name, then it is also likely that the electronic mail protocol translator 219 cannot access the user's electronic mail account because the user has provided an incorrect password or user.

Thus, in step 407, the real time query unit 217 determines if the identified server map contains more than one server name. If the server map does, then the process continues onto step 319, discussed below. If the server map does not contain more than one server name, then the automatic detection device 201 prompts the user to resubmit his or her user name and password in step 409, which the real time query unit 217 passes along to the electronic mail protocol translator 219. In step 411, the electronic mail protocol translator 219 attempts to access the electronic mail account using the resubmitted user name and password. If this attempt is successful, then the operation of the automatic detection device proceeds to step 317. If it is unsuccessful, then the operation of the automatic detection device proceeds with step 319.

It should be noted that the automatic detection device 201 can prompt the user to resubmit his or user name directly, or indirectly through the address of the user's electronic mail account. That is, in step 409 (and in step 323 discussed below), the automatic detection device 201 can ask the user to submit only his or her user name for the electronic mail account. Alternately, in step 409 (and in step 323 discussed below), the automatic detection device 201 can ask the user to resubmit the address for the user's electronic mail account. The address decomposer 209 can then parse the address to obtain the user name.

As will be appreciated by those of ordinary skill in the art, if the server map of a known domain has a large number of server names, then it may not be convenient for the real time query unit 217 to attempt to access all of the servers listed in the server map. Instead, the real time query unit 217 may attempt to access only a portion of the server names included in the server map. Thus, the number of server names that the real time query unit 217 makes available to electronic mail protocol translator 219 for access attempts may be substantially less than the total number of server names contained in the server map. Also, it will be appreciated that a number of various techniques can be employed to determine which server names will be available to the electronic mail protocol translator 219 for access attempts. For example, if the user's residence address is in a geographical region serviced by particular servers listed in the server map, then only these servers may be available to the electronic mail protocol translator 219 for access attempts. Alternately, the most frequently accessed servers or the servers hosting the largest number of electronic mail accounts could be used as criteria to determine which server names will be provided to the electronic mail protocol translator 219 for access attempts.

Returning now to FIG. 3, if the operation of the real time query unit 217 shown in FIG. 4 successfully accesses the user's electronic mail account, then the automatic detection device 201 processor stores the successful server name for future access to the electronic mail account in step 317. Also, the output unit 207 informs the user that the configuration process has completed successfully. The automatic detection device 201 then halts operation.

If, on the other hand, the automatic detection device 201 was not able to access the user's electronic mail account using any of the available computer servers listed in the server map, then in step 319 the host name generator 215 creates default server names for accessing the electronic mail account. Similarly, if the domain extracted from the user's electronic mail address in step 305 does not match a "known" domain stored in the server database 213, the processor unit 209 creates one or more default server names for accessing the electronic mail account in step 319.

More particularly, the host name generator 215 concatenates each of a set of pre-configured server name prefixes with the domain extracted from the user's electronic mail address in step 305 to form a complete default server name that conforms to common server naming conventions. For example, if the embodiment of the invention only supports the POP3 protocol, the pre-configured server name prefixes may include the most commonly used prefixes for accessing servers employing this protocol: "mail.", "pop.", and "pop3.". Because many computer servers for hosting electronic mail accounts are shipped "out-of-the-box" both ready to support the POP3 protocol and also have default server naming conventions, step 319 is likely to produce a default server name corresponding to the actual name of the server computer hosting the electronic mail account. Of course, if the automatic detection device 201 supports other or additional electronic mail protocols, then the preconfigured server name prefixes will include other or additional prefixes for concatenation to the domain extracted from the user's electronic mail address.

In step 321, the real time query unit 317 then attempts to access the user's electronic mail account (through the electronic mail protocol translator 219) using each of the default server names, the password obtained in step 301 and the user name extracted from the user's electronic mail address in step 305. If the electronic mail protocol translator 219 is able to connect and logon to the electronic mail account through a computer server using a default server name generated in step 319, then the automatic detection device 201 stores that default server name in step 317 for future access to the electronic mail account, and the output unit 207 informs the user that the configuration process has completed successfully. Additionally, with some embodiments of the invention, the real time query unit 217 may add the default server name to the list of known servers in the server database 213. Further, if the automatic detection device 201 supports more than one electronic mail protocol, the real time query unit 217 may store also the electronic mail protocol successfully employed to access the user's electronic mail account for future access to the user's electronic mail account. Alternately, or additionally, the real time query unit 217 may store the successfully employed electronic mail protocol with the listing of the server among the known servers in the server database 213. The automatic detection device 201 then halts operation.

If, on the other hand, the electronic mail protocol translator 219 is unable to access the electronic mail account through a computer server using one of the default server names generated in step 319, then in step 323 automatic detection device 201 prompts the user to manually enter the server name hosting the electronic mail account, and to resubmit the user name and the user's password for the electronic mail account. In step 325, the real time query unit 317 attempts to access the user's electronic mail account (through the electronic mail protocol translator 219) using the submitted server name, user name, and password. If this attempt is successful, then the operation of the automatic detection device 201 proceeds to step 317. Otherwise, steps 321 and 323 are repeated until the user cancels the configuration process.

The present invention has been described above by way of specific exemplary embodiments, and the many features and advantages of the present invention are apparent from the written description. For example, while the above-described embodiments of the invention have been described for use at a server, it may also be employed for use with a local electronic mail messaging application on a local computer, such as Microsoft's Outlook or Outlook Express. Thus, it is intended that the appended claims cover all such features and advantages of the invention.

Further, since numerous modifications and changes will readily occur to those skilled in the art, the specification is not intended to limit the invention to the exact construction and operation ad illustrated and described. Instead, the invention may include any one or more elements from the apparatus and methods described herein in any combination or subcombination. For example, various embodiments of the invention may omit the step of determining if a domain is included in a list of closed domains without departing from the scope and spirit of the invention. Accordingly, there are any number of alternative combinations for defining the invention, which incorporate one or more elements from the specification (including the drawings, claims, and summary of the invention) in any combinations or subcombinations. Hence, all suitable modifications and equivalents may be considered as falling within the scope of the appended claims.

What is claimed is:

1. A method for determining information for accessing an electronic mail account according to an electronic mail protocol, comprising:

receiving an address for delivering electronic mail to an electronic mail account;

receiving a password for accessing the electronic mail account;

extracting, from the address, a user name and an electronic mail account domain for the electronic mail account; and determining whether the electronic mail account domain, user name and password can be used to access the electronic mail account according to the electronic mail protocol, wherein the step of determining whether the electronic mail account domain, user name and password can be used to access the electronic mail account according to the electronic mail protocol includes determining if the electronic mail account domain is included in a list of closed domains the do not include server computers employing the electronic mail protocol; and if the electronic mail account domain is not included in the list of closed domains:

accessing a list of known domains, such that at least one server computer known to employ the electronic mail protocol is associated with each of the known domains;

mapping the electronic mail account domain against the list of known domains; and if the electronic mail account domain is included in the list of known domains, attempting to access the electronic mail account at one or more of the server computers associated with the electronic mail account domain using the user name and password.

2. The method recited in claim 1, wherein, if only one computer server employing the electronic mail protocol is associated with the electronic mail account domain and the electronic mail account cannot be accessed through the one computer server, then prompting a user to resubmit the user name and password for the electronic mail account, and attempting to access the electronic mail account at the one computer server according to the electronic mail protocol by using the resubmitted user name and password.

3. The method recited in claim 2, wherein the user is prompted to resubmit the user name by resubmitting the address for delivering electronic mail to the electronic mail account.

4. The method recited in claim 2, wherein, if the electronic mail account cannot be accessed at the one computer server according to the electronic mail protocol by using the resubmitted user name and password, further including:

concatenating a server name prefix with the electronic mail account domain to form a default name for a server computer; and attempting to access the electronic mail account according to the electronic mail protocol by using the default name, the user name and the password.

5. The method recited in claim 4, wherein the server name prefix is selected from the group consisting of: "mail.", "pop.", and "pop3.".

6. The method recited in claim 4, wherein, if the electronic mail account cannot be accessed according to the electronic mail protocol by using the default server name, the user name and the password, further including the step of prompting a user to provide a server name for accessing the electronic mail account.

7. The method recited in claim 3, if the electronic mail account domain is not included in the list of known domains, further including concatenating a server name prefix with the electronic mail account domain to form a default name for a server computer; and attempting to access the electronic mail account according to the electronic mail protocol by using the default name, the user name and the password.

8. The method recited in claim 7, wherein the server name prefix is selected from the group consisting of: "mail.", "pop.", and "pop3.".

9. The method recited in claim 7, wherein, if the electronic mail account cannot be accessed according to the electronic mail protocol by using the default server name, the user name and the password, further including the step of prompting a user to provide a server name for accessing the electronic mail account.

10. The method recited in claim 1, wherein the electronic mail protocol is selected from the group consisting of: the post office protocol, the Internet message access protocol, the Microsoft Exchange electronic mail protocol, and the Lotus Notes electronic mail protocol.

11. The method recited in claim 1, wherein the address and password are received from a user of the electronic mail account.

12. The method recited in claim 1, wherein the address and password are received from an electronic mail messaging software application.

13. A method of determining information for accessing an electronic mail account according to an electronic mail protocol, comprising:

receiving an address for delivering electronic mail to an electronic mail account;

receiving a password for accessing the electronic mail account;

extracting, from the address, a user name and an electronic mail account domain for the electronic mail account; and determining whether the electronic mail account domain, user name and password can be used to access the electronic mail account according to the electronic mail protocol, wherein the step of determining whether the electronic mail account domain, user name and password can be used to access the electronic mail account according to the electronic mail protocol includes:

concatenating a server name prefix with the electronic mail account domain to form a default name for a server computer; and attempting to access the electronic mail account according to the electronic mail protocol by using the default name, the user name and the password;

determining if the electronic mail account domain is included in a list of closed domains the do not include server computers employing the electronic mail protocol; and if the electronic mail account domain is not included in the list of closed domains:

accessing a list of known domains, such that at least one server computer known to employ the electronic mail protocol is associated with each of the known domains;

mapping the electronic mail account domain against the list of known domains; and if the electronic mail account domain is included in the list of known domains, attempting to access the electronic mail account at one or more of the server computers associated with the electronic mail account domain using the user name and password.

14. The method recited in claim 13, wherein the server name prefix is selected from the group consisting of: "mail.", "pop.", and "pop3.".

15. The method recited in claim 13, wherein, if the electronic mail account cannot be accessed using the default server name, the user name and the address, further including prompting a user to provide a server name for accessing the electronic mail account.

* * * * *